2 Sheets—Sheet 1.
R. M. CURTISS.
ELECTRICAL SAFETY DEVICE FOR ELEVATORS.
No. 10,838. Reissued May 31, 1887.
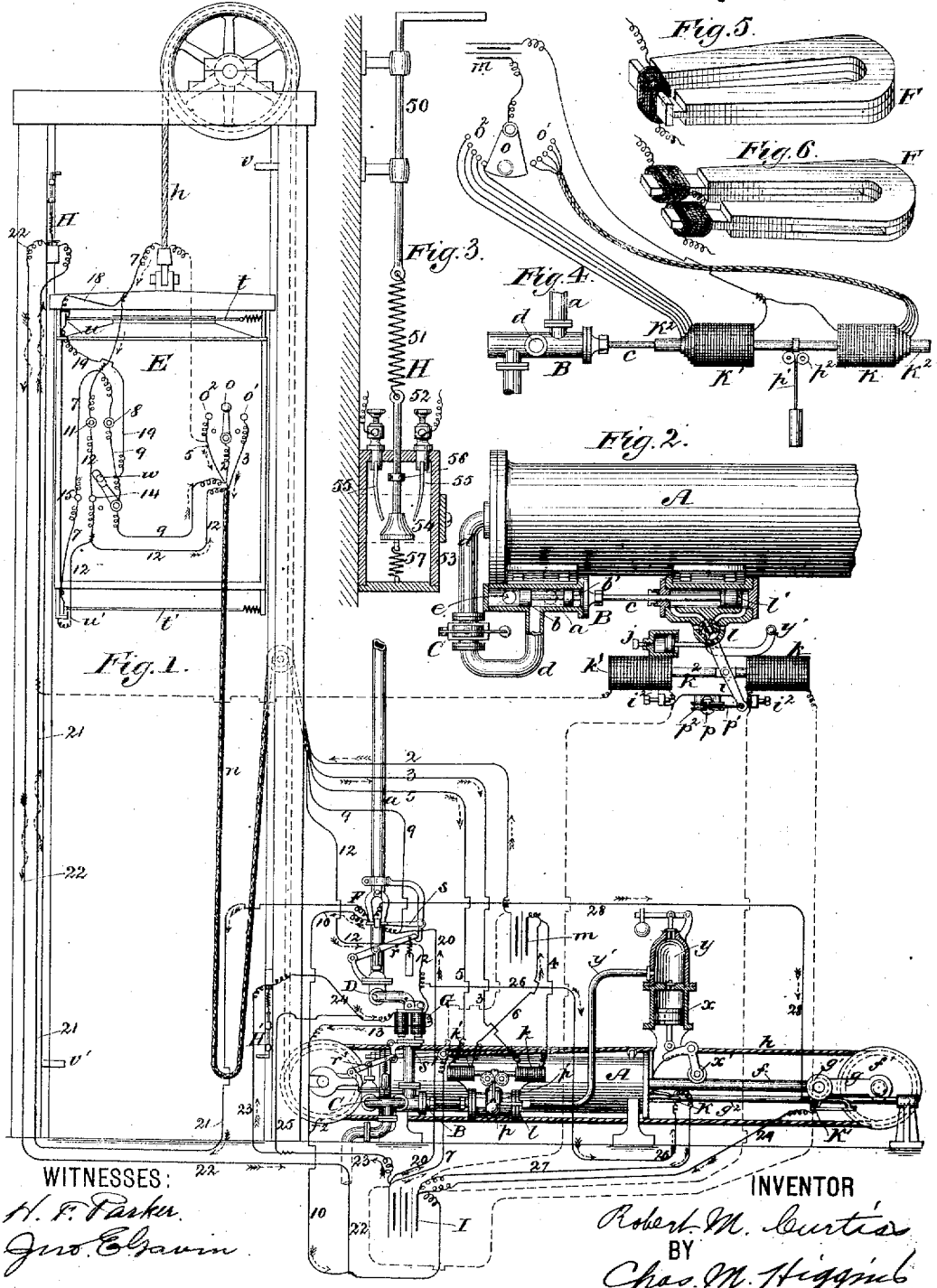
WITNESSES:
H. F. Parker.
Jno. E. Gavin
INVENTOR
Robert M. Curtiss
BY
Chas. M. Higgins.
ATTORNEY

R. M. CURTISS.
ELECTRICAL SAFETY DEVICE FOR ELEVATORS.
No. 10,838. Reissued May 31, 1887.
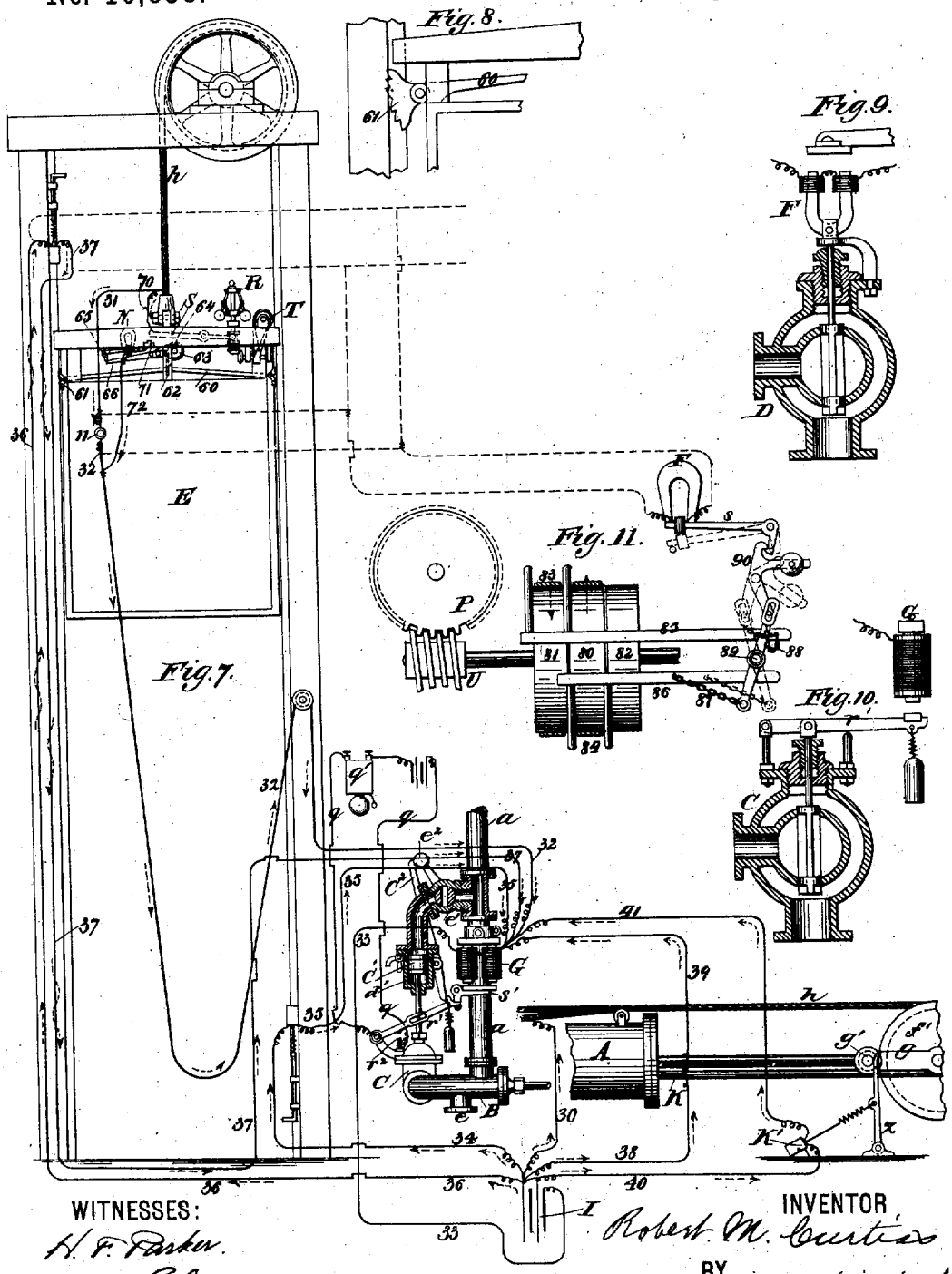
WITNESSES:
H. F. Parker.
Jno. E. Gavin
INVENTOR
Robert M. Curtiss
BY
Chas. M. Higgins
ATTORNEY

UNITED STATES PATENT OFFICE.

ROBERT M. CURTISS, OF BROOKLYN, NEW YORK.

ELECTRICAL SAFETY DEVICE FOR ELEVATORS.

SPECIFICATION forming part of Reissued Letters Patent No. 10,838, dated May 31, 1887.

Original No. 314,167, dated March 17, 1885. Application for reissue filed March 15, 1887. Serial No. 231,071.

*To all whom it may concern:*

Be it known that I, ROBERT M. CURTISS, of Brooklyn, Kings county, New York, have invented certain new and useful Improvements in Electrical Safety Devices for Elevators, of which the following is a specification.

My present invention aims to control the movements of the car and hoisting-engine by the agency of electricity governed by the operator in the car, and also automatically by the movements of the car itself, and it is partly related to those systems shown in my former patents, Nos. 216,024 and 266,107, and in my pending application, Serial No. 118,294, filed January 22, 1884, (on which a patent was granted August 18, 1885, No. 324,751.) My former inventions, however, chiefly concerned safety devices involving an electric circuit which traversed the cable, car, and hoisting machinery, so that in case of breakage of any part safety devices were released by the action of magnets to stop and sustain the car. In the latter application the collision of any object with guard-bars on the shaft or car would automatically break an electric circuit and cause magnets to release a stop-valve or other stopping devices to stop the engine and car, and thus prevent the object from being crushed by the car. Besides this automatic means for stopping the car, a manual switch was placed in the car, whereby the circuit could be broken manually at any time to stop the car where desired, in case of accident.

In my former inventions it was assumed that the ordinary check-rope and mechanical devices for working the engine-valves from the car were employed; but in my present case I employ electro-magnets or their equivalents to actuate the engine-valves to cause the car to ascend, descend, or stop, which magnet is included in an electric circuit which is extended to the car and controlled by a switch in the car, thus enabling the movements of the car and engine to be controlled quickly and with great ease by the operator in the car, and obviating the objections which apply to the check-rope heretofore used.

In my former inventions no provision was made for automatically limiting the movement of the car and hoisting-engine at each end of the travel in case the check-rope broke or the stopping and starting valves of the engine became unmanageable. This is a contingency or accident which is very likely to occur with existing elevators, particularly those of the hydraulic kind, in which case the piston would tend to move out of the end of the cylinder and force the car beyond the top beams of the shaft, thus causing a general wreck, which many elevators in present use have no provision at all to guard against. In my present invention, however, I guard against this very probable and serious form of accident in a very simple and effective way by providing a special stop or safety-valve or its equivalent on the hoisting-engine, which is controlled by an electro-magnet or its equivalent in an electric circuit, which is completed through contacts at the top and bottom of the car or at the top and bottom of the shaft, and a projection is arranged in the path of the car when near the end of the top and bottom of the shaft, so that in case the car should ever move beyond its normal limit of travel it will strike said projections, thereby operate the contacts, and cause the magnet to actuate the stop-valve, and thus automatically stop the engine and prevent the car from being moved too far in the shaft. Instead of these contacts and projections being on the the shaft or car, they may be on the guides and piston-rod or cross-head of the hoisting-engine, to operate in case the cross-head moves beyond its normal limit, and thus check the movement of the car in a similar way.

My present invention, therefore, consists mainly, in the features above outlined, and also in minor features and in details connected therewith, as hereinafter fully set forth and claimed.

In the drawings annexed, Figure 1 presents an elevation of a hydraulic elevating apparatus provided with my improvements. Fig. 2 is an enlarged fragmentary sectional plan of the engine-cylinder and its electric valve-operating mechanism. Fig. 3 is an enlarged sectional elevation of one of the contacts which determine the automatic limit of the car's movement. Fig. 4 illustrates a modification of the electric valve-operating mechanism. Figs. 5 and 6 illustrate different forms of magnets used to control the safety stop-valves. Fig. 7 gives an elevation of a hydraulic hoisting apparatus similar to that in Fig. 1, but with some modifications and additional features not shown in Fig. 1. Fig. 8 illustrates a detail of Fig. 7—viz., the safety-catches on the car. Figs. 9 and 10 show a different form of safety stop-valve with different forms of magnets for controlling them. Fig. 11 illustrates the safety stop-magnet applied to the belt-shipper in hoisting-machines driven by belts from a power-shaft.

In Figs. 1 and 7 I have shown a well-known form of hydraulic elevator, in which the engine-cylinder A is horizontal, closed at one end and open at the other. *f* indicates the piston-rod, which protrudes from the open end of the cylinder and connects to the cross-head *g*, which carries the movable sheaves $f'$, and is also provided with the guide-rollers $g'$, which roll on the guide-rods $g^2$. The cable *h* is fixed at one end near the closed end of the cylinder, as seen in Fig. 1, thence passes in loops over the fixed sheaves $f^2$ and movable sheaves $f'$, and connects at the opposite end to the car E in the usual manner, as illustrated in the drawings. Water is admitted behind the piston from an elevated tank through the pipe *a*, which is provided with the main stopping and starting valve B, which is of the usual double-acting balanced kind, (shown best in Fig. 2)—that is, the cylinder of the valve is provided with two pistons, *b b'*, joined by a rod, *c*. The stand-pipe *a* always opens between the pistons *b b'*, and thus renders the valve balanced, as will be understood.

In Fig. 2, *d* indicates the inlet port or pipe leading from the valve to the closed end of the engine-cylinder A, and *e* indicates the outlet or exhaust port leading from the valve to the lower tank, into which the spent water is exhausted when the car descends. When the valve is set, as shown in Fig. 2, water is admitted from the elevated tank to the engine-cylinder, and thus propels the piston forward to raise the car, while if the valve is shifted outward, so that the piston *b* passes beyond the pipe *d*, the water will be shut off from the tank and the pipe *d* made to communicate with the exhaust-pipe *e*, thus allowing the water to escape from the cylinder, and thus permitting the piston to retreat and the car to descend. When the valve is so moved that the piston *b* just covers the inlet port or pipe *d*, the piston and car will be stopped at any position desired. It will hence be seen that the general arrangement of the cylinder, piston, valve, &c., with the cable and car is of the ordinary character, and forms no part of my improvement. It may now be observed, however, that instead of employing a check-rope extending from the car to operate the main valve B in the usual mechanical manner, as heretofore, I operate the valve by electro-magnets through an electric circuit extended to the car, and by referring to Fig. 1, in connection with Figs. 2 and 4, this electric-valve mechanism will be readily understood.

*k k'* indicate two powerful solenoids placed in line with each other, with their cores or core $k^2$ connected to a valve-lever, *i*, of a small steam, air, or water engine, *l*, whose piston $l'$ connects to the valve-rod *c* of the main valve B. The motion of the cores and the valve-lever *i* is limited by stops $i^2$, and it will be seen that when the core is attracted into one solenoid it will be retracted from the other, and the valve-lever will be moved over against one stop, so as to admit pressure onto one or the other side of the piston $l'$, and thus shift the valve-pistons *b b'*, so as to cause the car to ascend or descend, as will be readily comprehended.

Referring to Fig. 1, it will be seen that the solenoids *k k'* are connected by wires with a battery, *m*, and that wires 2 3 5 extend from the battery and solenoids to a pendent loop of cable, *n*, one end of which is fastened at the middle of the shaft, while the other end connects to the car, so that the cable hangs pendent from the car and is free to move therewith as the car ascends or descends. The wire 2 of the cable *n* extends from one pole of the battery *m* and connects to the switch *o* in the car, which switch has two seats, $o'$ $o^2$. The wire 3 extends from seat $o'$ to one end of the solenoid *k*, while the other end of the solenoid connects by wire 4 with battery *m*. The other seat, $o^2$, is connected by wire 5 with one end of the other solenoid, $k'$, the opposite end of which connects by wire 6 with battery *m*. It will therefore be seen that if the switch *o* is placed in its mid-position, as shown in Fig. 1, both circuits from the battery *m* will be open and both solenoids inactive, and hence the core $k^2$ will lie neutral between the solenoids and tend to assume a mid-position, to which it will be constantly drawn by a pendent weight, *p*, which is attached to a chain, $p'$, which passes between rollers $p^2$, fixed midway between the solenoids, and connects to the middle of the core, as shown in Fig. 1; also in Figs. 2 and 4. When the core is, therefore, held in the mid-position shown in Figs. 1 and 4, we will assume that the valve-lever *i*, as well as the motor-piston $l'$ of the water-valve pistons *b b'*, will all be in their mid-positions and the flow of water to or from the elevator-cylinder A will be shut off, and hence the elevator-piston and car will be at rest. If, however, the switch *o* be moved over on the seat $o'$, the current will now flow from battery *m* by wire 2 to switch *o*, seat $o'$, and wire 3 to solenoid *k*, and thence return by wire 4 to the battery, thus energizing the solenoid *k*, which will attract the core $k^2$ and move the valve-lever *i*, as seen in Fig. 2, so as to admit pressure on the side of the piston $l'$ to move said piston, with the valve-pistons *b b'*, to the right, and thus admit water-pressure in the elevator-cylinder to lift the car. If, now, the switch be moved back to its mid-position, the circuit will be broken with solenoid *k*; but the piston $l'$ and the main valve B will remain in the position shown in Fig. 2, so that the ascent of the car continues. If it is desired to stop the car at any point in the ascent, the switch is moved over on the seat $o^2$ and the current will now flow from battery $m$ by wire 2, switch $o$, seat $o^2$, and wire 5 to solenoid $k'$, and thence by wire 6 to battery $m$, thus energizing the solenoid $k'$, which will move the core $k^2$ and valve-lever $i$ fully to the left, and thus reverse the valve of motor $l$ and cause the pistons $l'$ and $b$ $b'$ to be moved toward their mid-positions, which is the position for stopping the car either in the ascent or descent; and when the core $k^2$ and pistons $l'$ and $b$ $b'$ are thus brought into said mid-position, which will be made known to the operator by the full stoppage of the car, he then moves the switch back to its mid-position, thus breaking circuit on the left solenoid $k'$, and thus leaving the valve-lever $i$ and the pistons $l'$ $b$ $b'$ in the mid or stopping position described. In this mid-position of the valve-lever $i$ it will be understood from Fig. 2 that all ports of the valve-motor $l$ will be closed, thus retaining the pistons $l'$ and $b$ $b'$ in the mid-position, and thus keeping the car stationary as long as required. If it is desired to again ascend after a stop, the switch will be moved over on the seat $o'$, as before; but if it is desired to descend, the switch will be moved back on the seat $o^2$, which will put the left solenoid $k'$ again in circuit, and which will now draw the core $k^2$ from its mid or stopping position to its full stroke to the left, thus again opening the valve of the motor $l$ and causing the pistons $l'$ and $b$ $b'$ to move to their full extent to the left, thus allowing the exhaust of water from the elevator-cylinder A and thereby causing the car to descend. To stop the car in the descent, the switch is moved over onto the seat $o'$ until the valve is shifted to the mid-position, as before described, when the switch is moved back again into the mid-position to stop the valve mechanism in said mid-position, as will be understood. Hence to ascend, the switch is always moved over onto the seat $o'$, and when the car is in motion the switch is moved to mid-position. To stop in the ascent, the switch is moved onto seat $o^2$ until the car is brought to rest, when the switch is at once thrown over to its mid or neutral position. To descend, the switch is placed on seat $o^2$ until the car is found to move downward, when the switch is put in its mid-position. To stop in the descent, the switch is put on seat $o'$ until the car stops, when the switch is at once placed in its neutral position.

It will be noted that by having the piston $l'$ of the small motor $l$ connected to a balanced valve, B, that the motor may be quite small and work the valve effectively, and that the auxiliary valve on the motor may be made very small and light, and can thus be easily operated by electro-magnets, as shown. It will be seen on reference to Fig. 2 that the small valve motor $l$ is of course double acting, and that the valve attached to valve-lever $i$ is a rotary double-acting inducting and exhausting valve.

In some cases the core of the solenoids might be connected directly to the valve-rod $c$, as indicated in Fig. 4, so as to operate the water-valve B by direct attraction. Fig. 4 also shows that the solenoids may be wound in parallel sections or multiple arc, all the sections connecting at one end to a common return-wire to the battery $m$, while each section connects at the opposite end to a distinct switch-seat, on which the switch $o$ may be turned successively to throw more or less of the sections into circuit and thus admit the current gradually to the solenoids and enable the force of the same to be regulated as may be required, which method is well known to electricians, and needs no further illustration.

In Fig. 2 I show the piston of a dash-pot, $j$, connected to the valve-lever $i$, to retard the action of the solenoids and prevent too sudden or jerky motions, as commonly employed in similar electric mechanism. It will now be seen that by this system of working the main starting and stopping valve of the elevator by magnets controlled by a circuit from the car not only can the valve be made to act very promptly, but the operator in the car is relieved from the serious exertion required to operate the usual check-rope and its mechanical adjuncts, and requires only to move a light switch in the car, which is of course done with great ease and quickness, and will enable the car to be stopped and started much more quickly and with greater safety, and will obviate the use of the endless check-rope and the cumbersome adjuncts of the usual mechanical valve mechanism, and thus accomplish a great improvement in the operation of elevators. It will now be readily understood that, in case the main valve B should become at any time deranged or unmanageable, so as to fail to close when the car or piston reached their normal limits of movement, the piston would tend to move out of the end of the cylinder and force the car up against the top beams of the shaft, or out through the roof of the building, and thus cause an entire wreck of the apparatus, this being, in fact, a form of accident to which elevators are quite liable, and which occurs usually by the breakage of the check-rope or other derangement of the valve mechanism. In order, therefore, to prevent this form of accident, I employ, in addition to the main valve B, a safety stop-valve, C, which I introduce in the pipe $d$, between the main valve B and the engine cylinder A, as shown both in Figs. 1 and 7; and I also prefer to introduce a second safety stop valve, D, in the stand-pipe $a$, between the main valve B and the elevated tank, as shown in Fig. 1. These valves C and D may be of the ordinary sliding-gate kind, as indicated in Figs. 4 and 7, or of the double seat balanced kind, shown in Figs. 9 and 10, both forms of valves being well known and sufficiently illustrated in the drawings as to require no further description. Now, both of the stop-valves C D are normally held open by the agency of electro-magnets F G, so that they do not affect the passage of water to or from the cylinder, and hence do not interfere with the action of the main valve B in controlling the movements of the car. The stems of the valves C D connect to weighted valve-operating levers *r r'*, which are engaged and held up by the armature detent levers *s s'*, thus holding the valves open. The magnets F G are placed in electric circuits which are completed through contacts H H' at the top and bottom of the shaft, and also through contacts K K' at each end of the cross-head guides, so that if at any time the cross-head or the car move beyond their normal limits one or the other of the contacts will be operated, and the magnets F or G energized to move their armatures, and thus cause the detents *s* or *s'* to release one of the weighted levers, which will at once fall and close its valve, thus stopping the further movement of the piston or car, and thus effectually preventing any accident or wreck of the apparatus. The magnet F is represented as a polarized electro-magnet, and the magnet G as a common electro-magnet, both, however, being placed in an open circuit with the battery I. The body of the magnet F, as shown best in Fig. 5, is of course a permanent magnet with a soft-iron armature wound with a coil, which is the only part of the magnet in circuit, as seen in Fig. 1, the said coiled armature being connected with the detent-lever *s*. The armature of the magnet F is hence held normally attracted by the permanent magnetism, and thus holds the detent-lever engaged with the raised valve-lever *r*; but as soon as an electric current is sent through the armature-coil of the magnet the attraction of the permanent magnet is neutralized and the armature falls off, thus moving the detent and allowing the lever *r* to fall and close the valve D. The magnet G being a common electro-magnet, its armature, which is part of the detent *s'*, is normally retracted, and hence holds the detent engaged with the raised valve-lever *r'* in said retracted position; but as soon as a current is sent through the coils of the magnet it attracts its armature and thus releases the weighted valve lever and allows the valve to close.

Fig. 6 shows how the magnet F may be modified by having the coils on the poles of the permanent magnet instead of on the soft-iron armature, as will be readily understood.

Referring to Fig. 3, the construction of the contacts H H' at the top and bottom of the shaft will be readily understood.

50 represents a sliding rod mounted in eye-brackets on the side of the shaft, and having one end projecting out at right angles in the path of the car, so that when the car moves beyond its normal limit it will collide with and move the bent rod. This rod is connected by the spring 51 with the contact-bolt 52, which projects through the top of a non-conducting dust-proof box, 53, fixed on the side of the shaft, and which incloses the contacting-head 54 of the bolt, and also incloses two contact-tongues, 55, which project from binding-posts on the top of the box and approach the tapering contact-head 54. The circuit-wires connect to the binding-posts on the top of the box, and hence when the bolt is moved outward its head 54 will pass between the tongues 55, and thus close the circuit. A stop-collar, 56, on the bolt limits the outward movement of the bolt, and a spring, 57, tends constantly to retract the bolt, and thus keep the contact open, as shown in Fig. 3.

Referring to Fig. 1, it will be understood that the contacts H H' are placed at the top and bottom of the shaft at points a little beyond the normal travel of the car, so that, hence, if at any time the car travels up beyond the normal limit it will strike the bent rod of the upper contact H, and thus raise the same and close the contact, which will at once close the circuit from the battery I on the upper magnet, F, and the current will therefore take the following course: From battery I, by wire 20, to armature-coil of magnet F, thence by wire 21 to contact, H, and from contact H, by wire 22, back to opposite side of battery. Hence this closure of the circuit will at once throw off the armature-detent *s* and release the weighted lever *r*, which will fall and close the stop-valve D, and thus shut off the flow of water from the tank to the cylinder, and thereby stop the further rise of the car. The elasticity of spring 57 will allow the rod to move a short distance with the car after the contact is closed, and before the movement of the car is checked by the closing of the valves, as will be understood. If, on the other hand, the car moves beyond its limit in descending, it will strike the lower contact, H', and therefore close it, as before described, and cause the current to flow to the lower magnet, G, and therefore close the lower valve, C, and thus prevent the further exhaust of the water, and therefore stop the descent of the car. When the contact H' is thus closed, the course of the current will be as follows: From the battery I by wire 23 to contact H', thence by wire 24 to magnet G, and returning by wires 13 and 10 to opposite side of battery.

The contacts K K' at the ends of the cross-head guides consist, as shown in Fig. 1, of simple spring-tongues separated from a metal base-plate, the tongues being placed in the path of the guide-roller *g'* at points a little beyond the normal limits of the travel of the cross-head; hence if the cross-head moves out beyond its normal limit it will close the outer contact, K', and the current will now flow from the battery I by wire 20 to magnet F, and thence by wire 28 to contact K', and from contact K' by wire 29 back to battery, thus energizing the magnet F and causing the upper stop-valve, D, to close and stop the further advance of the cross-head and the rise of the car, as before described. If the cross-head moves too far inward on the return-stroke, the roller *g'* will close the inner contact, K, and the circuit will then flow as follows: From battery I by wires 23 and 25 to magnet G, thence by wire 26 to contact K, returning by wire 27 to opposite side of battery, thereby energizing magnet G and causing the lower stop-valve, C, to become released and closed, thus preventing the further retreat of the piston and descent of the car. It will therefore be seen that the upper stop-valve, D, stops the motion of the car going up, while the lower stop-valve, C, stops the motion going down, and that the magnets of these valves are placed in two circuits, one of which is controlled by the contacts in the shaft operated by the car, and the other of which is controlled by contacts on the piston-guides operated by the cross-head. If desired, however, but one valve may be used to stop the motion in both directions, as shown in Fig. 7, and hereinafter described, and but one set of circuits and contacts may be used—either those on the shaft or those on the engine—but the use of both is considered safest, as one acts as a check on the other.

Referring to Fig. 1, it will be readily seen that the safety guard-bars described in my aforesaid patent, No. 324,751, may be introduced in the circuit of the magnets F G, so that should any person collide with the guard-bars in attempting to enter or leave the moving car the movement of the colliding bar will close the circuits on the magnet F or G, and thus close the appropriate stop-valve and stop the motion of the car before the person can be crushed. To illustrate this application, I have shown a yielding guard-bar, *t t'*, at the top and bottom of the car, said yielding bar (which is a flexible cord or wire) being fixed at one end, while the other end is connected to one member of normally-open contacts *u u'* on the car similar to what is shown in Figs. 2 and 4 of my aforesaid patent. These contacts are placed in the circuits of the magnets F G, but by a different course from that already described. It will therefore be seen that if any obstructions lie in the way of the car in going up or down collision will be made with the bar *t* or *t'*, and the contact *u* or *u'* thus closed, and the magnet F or G thus thrown into circuit to close either valve C or D to stop the movement of the car before any damage can be done by such collision on the principle claimed in my aforesaid patent.

Besides the different means just described for automatically closing the stop-valves C D, I also prefer to provide the car with push-buttons 8 and 11 and with a switch, *w*, whereby the circuits on the magnets of either or both valves may be closed manually to stop the car intentionally at any point, should some emergency require it. The push-button S is connected between the wires 7 and 9, and it will therefore be seen that when the button is closed the current will flow from battery I by wire 7 through push-button to wire 9, to magnet F, and from thence by wire 10 to battery I, and hence the valve D will be closed to stop the up motion of the car, as before described. The push-button 11 is connected between the wires 7 and 12, and when the button is closed current will flow, as before, through wire 7, through push-button to wire 12, thence to magnet, G and from magnet by wires 24, 25, and 23 to opposite side of battery I. Consequently magnet G will be energized and the valve C will be closed to stop the down motion of the car. The switch *w* has one end connected to wire 9, and has two seats, 14 and 15, connected, respectively, to wires 7 and 12. Consequently if the switch is moved onto the seats 14 and 15 the circuit will be closed with both magnets, as will be readily seen by tracing the connections, and hence both stop-valves will be closed instantly, and the car restrained from motion up or down.

The advantage of having distinct valves C and D to control the up and down movements, and distinct push-buttons 11 8 to govern the magnets thereof, is that, in case an obstruction or accident is met with during the travel of the car in one direction, the car can be instantly stopped in that direction and then allowed to move in the opposite direction by shifting the main valve B, and when the car is moved opposite the next door it can be there instantly stopped by touching the other push-button, thus allowing the passengers to get out as soon as possible after the discovery of any derangement.

The dotted lines connecting Figs. 1 and 2 will show that, if desired, the solenoids *k k'*, which govern the action of the main valve B, may be placed in circuit with the contacts H H' or K K', so that when the car moves beyond its normal limits the main valve will be automatically shifted to stop the further movement of the car.

Referring to Fig. 2, it will be understood that the small engine *l*, for working the main valve B, may be supplied with steam or compressed air, or with water under pressure from the pipe *a*, or other motive fluid. In Fig. 1, however, I show an air-compressing device operated by the movement of the main cross-head to supply the valve-engine *l*. In this device *x* represents an air-pump with a gravitating piston connected with an elbow-lever, *x'*, one arm of which lies in the path of the cross-head *g* when near the end of its stroke, so that at each return movement of the cross-head the pump is operated to compress air into the reservoir *y*, from which the valve-engine *l* is supplied by pipe *y'*.

Referring to Fig. 7, it will be seen that the back contact, K, on the cross-head guides is the same as shown in Fig. 1; but the front contact, K', is of the character shown in Fig. 1, except that the contact-bolt is connected with a lever, *z*, the tip of which lies in the path of a projection on the cross-head when at the end of its outer movement. In this Fig. 7 it will be also seen that the stop-valve C is placed between the main valve B and the cylinder A, and consequently when it is closed it will prevent the movement of the car in either direction. This valve C is in this case presumed to be of the sliding-gate kind, which usually require considerable force to operate them, and for this reason I have shown the stem of the valve connected not only to the weighted valve-lever $r'$, as before, but also to a ram-piston, $c'$, in a water-cylinder, $d'$, which connects to the stand-pipe $a$ through a valve, $e'$. Normally, of course, the valve $e'$ is closed, the valve C is opened, and the piston $c'$ and weighted lever $r'$ are raised, the latter parts being held by the armature-detent $s'$. The valve $e'$ has also a weighted valve-lever, $c^2$, which is normally raised and held by the lever $c^2$, which is engaged by a shoulder on the tip of the lever $r'$. The magnet G, which corresponds to the magnet G in Fig. 1, is in circuit with the contacts at top and bottom of the shaft and on the cross-head guides; and hence when any of said contacts are closed the magnet G will attract the detent $s'$, and thus release the weighted lever $c^2$ and allow the same to fall, thus opening the valve $e'$ and admitting the water-pressure on the piston $c'$, which will forcibly close the valve C and stop the motion of the car in both directions. When the valve C is thus closed, the descent of the lever $r'$ will close the contacts $r^2$, and thus close an electric bell circuit, $q\,q$, and ring a bell, $q'$, to give notice to the engineer that some accident has occurred, to stop the apparatus. The course of the current to the magnet G, when the different contacts are closed, may be readily traced by referring to Fig. 7. Thus when the upper shaft-contact, H, is closed, the current will flow from battery I by wire 36 to contact H, and by wire 37 to magnet G, and thence return by wire 33 to battery. If contact H′ is closed, the current will flow from battery I by wire 34 to contact H′, thence by wire 35 to magnet G, and return by wire 33, as before. When contact K is closed, the current flows out of battery by wire 38 to contact, thence by wire 39 to magnet G, and returns by wire 33. If contact K′ is closed, current flows thereto by wire 40, thence by wire 41 to magnet G, and returns by wire 33.

In addition to the aforesaid circuits with magnets G, I also prefer to carry a wire, 30, from the battery I to the fixed end of the cable $h$, and from the car end of the cable I extend a wire, 31, to a push-button, 11, in the car E, and from the push-button I carry a pendent looped wire or cable, 32, to the magnet G, and complete the circuit through wire 33 to battery, this circuit being normally open at the push-button 11. By closing the push-button 11, however, it will be seen that the operator in the car can instantly close the circuit on magnet G, and thus close the stop-valve C to stop the car at any point should some emergency require it, as before described.

In Fig. 7 I also show the car provided with safety-catches 60 61, which are normally held out of engagement with the guides, but which may be released to engage the guides and thus stop the car when required. These catches consist of a spring-bar, 60, on the ends of which are pivoted double-toothed cam-shoes 61, as best shown in Fig. 8, which shoes will engage the guide in a wedging manner in either direction when released against the same. The toggle-spring 60 is, however, normally bent up so as to withdraw the shoes 61 from the guides, and are thus held by a chain or band, 62, wound around a drum, 63, on which a brake-band, 64, is tightened by a lever, 66, to hold said spring up. This brake-lever is engaged by the detent-lever 65, which carries a coiled armature which is attracted by the permanent or polarized magnet N, thereby holding the safety-catches out of engagement during the continuation of said attraction. I also provide the car with a governor, R, which is driven by the movement of the car in any suitable way—for example, from a friction-wheel, T, which rolls on the guides and is suitably geared to the governor, as illustrated. The movable collar of the governor is connected to a contact-lever, S, which is connected by wire 70 with the wire 31 or with the cable, as shown. A contact-seat, 71, below the tip of the lever S is connected with one end of the armature-coil of magnet N, while the other end of the coil connects by wire 72 with wire 32. It will therefore be now seen that in case the car at any time acquires an abnormal or dangerous speed in moving up or down the action of the governor will move the lever S and close contact 71, and thus close circuit on magnet N, which will at once release its armature and thus allow the brake-lever 66 to fall and thus release the safety-catches 60 and stop the car in the guides. At the same instant the circuit will also be closed on the magnet G and the stop-valve C closed to stop the movement of the engine simultaneously with the car. When the contact 71 is thus closed, the course of the current may be traced as follows: From battery I, by wire 30, to the cable $h$, and by wire 70 to lever S and contact 71, thence to coil of magnet N, and by wire 72 to wire 32, to magnet G, and by wire 33 back to battery I.

If desired, the magnet N and the safety-catches 60 may be omitted and the governor and its contact retained, so as to always act to energize magnet G and close valve C in case the car acquires an abnormal speed at any time, as will be understood.

Referring to Fig. 9, it will be seen that I have shown the magnet F attached directly to the top of the stem of the stop-valve D. When the stem is raised to open the valve, the magnet will adhere to a fixed soft-iron armature, (shown above the magnet,) and thus hold the valve open; but as soon as a current is sent through the coils of the magnet the attraction of the magnet will be neutralized and the magnet will fall and thus close the valve, as shown in Fig. 9. Hence this form of valve and magnet may be substituted for that shown at F D in Fig. 1.

In Fig. 10 the stem of the valve C is shown connected to a weighted lever, $r'$, as in Fig. 1; but this lever is arranged to be attracted directly by the polarized magnet G, so as to normally hold the lever raised and the valve.

open by permanent magnetism. When a current is sent through the magnet-coil, however, its permanent magnetism will be neutralized and the lever will fall and close the valve, as shown.

In Figs. 1 and 7 I have shown my automatic electric stopping mechanism for limiting the movement of the car applied to a hydraulic elevator, in which the electro-magnet acts to close a valve to shut off the flow of the motive fluid to the engine; but the invention may of course be applied without any substantial change to elevators propelled by any other form of motor or by any other mechanical means.

In Fig. 11 I have shown the stop mechanism applied to hoisting machinery driven by belts. In this case P indicates the winding-drum of the elevator or hoist and U the worm-shaft which revolves the drum, this shaft being provided with the fast pulley 80 and the loose pulleys 81 82.

83 is a driving-belt having motion in one direction and 84 a belt having motion in the opposite direction, while 85 and 86 represent the belt-shippers thereof. These belt-shippers are presumed to be connected in the usual manner, (not shown,) with the check-rope extending to the car, so that by properly operating said check-rope the shippers may be so set as to throw either belt onto the fast pulley 80, and thus raise or lower the car, or throw both belts off the fast pulley onto the loose ones to stop the movement of the car. Each shipper is, however, also connected by chains 87 88 to a lever, 89, which is engaged by a weighted elbow-lever, 90, which is in turn engaged and held up by the armature-detent lever *s*, which is held attracted by the stop-magnet F with the same effect, as shown at F *s* in Fig. 1. The armature-coil of this magnet F is of course placed in circuit with the contacts H H′ on the shaft, as is sufficiently indicated by dotted lines connecting Figs. 7 and 11. It will now be seen that the chains 87 88, between the shipper and the lever 89, will allow the shippers to be moved back and forth by the check-rope mechanism to control the movements of the car without affecting the position of the levers 89 90 or the detent *s*. If, however, the car moves too far in the shaft, and thus closes one of the contacts H H′, the circuit will be closed on magnet F and the armature-detent *s* will at once fall and release the weighted lever 90, which, in falling, will move the lever 89, as shown by dotted lines, and thus pull on whichever chain happens to be taut, and thereby move the corresponding shipper and thus remove whichever belt happens to be on the fast pulley back onto the loose pulley, and thereby stop the movement of the car, as will be readily comprehended. It will be understood that any equivalent electric motor devices might be used in place of the electro-magnets shown—that is, any device in which mechanical force is produced by electricity; but at present I consider electro-magnets the only desirable form of electro-motor device, and at the same time where I claim magnets I assume it to be understood that I also include equivalents thereof.

It will be noted that in most instances I employ polarized electro-magnets in an open circuit, which have great advantages for my purposes, as they hold constantly during the normal condition of the elevator apparatus without consuming current, and when the circuit is closed they have the advantage of releasing their armatures very quickly, which is a great advantage in the stopping mechanism shown; but of course a closed circuit with normally-closed contacts and normally-energized magnets might be used, if desired.

It will be seen that the governor R and its adjuncts, as shown in Fig. 7, may be driven by the movement of the engine as well as by the movement of the car, and it will be observed that the employment of a governor to close a stop-valve or stopping device through the agency of a magnet and electric circuit forms one of the novel features of my invention.

It will be readily seen that the stopping-contacts H K on the shaft or engine may also be in circuit with the magnet N of the safety-catches on the car, so that when said contacts are closed by the movements of the car or engine beyond the normal limits the safety-catches on the car will be released to stop the same.

Referring to Figs. 1 and 7, it will be seen that the weight with which the valve-lever *r*′ is loaded is connected to the lever by an interposed spring, which cushions the momentum of the weight and prevents shock.

What I claim is—

1. The combination, with an elevator car and mechanism for stopping the same, of a magnet operatively connected with the stopping mechanism and arranged to normally hold the same inactive, and an electric circuit connected with said magnet, provided with a contact or contacts arranged relatively to the terminal movements of the hoisting apparatus, substantially as herein described, whereby the terminal movement of the apparatus beyond the normal limits operates said contact and causes the magnet to release the stopping mechanism to stop further movement.

2. The combination, with an elevator-car and its hoisting engine or machinery, of a valve or equivalent stopping device for stopping the motion of the engine, a magnet arranged to normally hold said stopping device inactive, and an electric circuit connected with said magnet and provided with a contact or contacts so arranged relatively to the terminal movements of the elevating apparatus that in case the car or engine moves beyond its normal limits said contacts are operated and the magnet actuated to release the stopping device to stop further movement.

3. The combination, with an elevator-car and its hoisting-engine, of a valve or stopping device for stopping said engine, with a magnet operatively connected with the valve or stopping device and arranged to normally hold it inactive, with one or more electric contacts on the shaft in the path of the car when near the end of its movement, and an electric circuit between said contacts and magnet whereby the movement of the car beyond its normal limits operates said contacts and thus actuates the magnet to release the stopping device to stop the car, substantially as herein set forth.

4. The combination, with an elevator-engine, of an independent safety stop-valve, C, arranged between the engine-cylinder and its main valve B, and an electric motor device operating said valve, substantially as shown and described.

5. The combination, with an elevator-engine, of a safety stop-valve arranged to check the motion thereof, a loaded lever arranged to close said valve, a detent arranged to hold said lever inactive, and an electro-magnet arranged to release said detent, substantially as and for the purpose set forth.

6. The combination, with an elevator-car and its hoisting-engine, of a valve, C, controlling the down motion of the car, and valve D, to control the up motion of the car, with magnets F G, arranged to hold said valves open, with electric circuits extending to the car from said magnets, and means for controlling the circuit of either magnet independently in the car, substantially as set forth.

7. The combination, with an elevator-car and its hoisting-engine, of a valve or its equivalent controlling the stopping or starting of the engine, with an electro magnet or magnets arranged to control the shifting of said valve, circuit opening or closing devices arranged at a distance from said valve and magnets, and an electric circuit in which said magnets and circuit opening and closing devices are included, substantially as herein set forth.

8. The combination, with an elevator-car and its hoisting-engine, of a valve or its equivalent controlling the stopping and starting of the engine, with a magnet or magnets arranged to control the shifting of said valve, an electric circuit extended from said magnet to the car, and means for breaking and closing said circuit in the car, substantially as herein set forth.

9. The combination, with an elevator-car and its hoisting-engine, of a balanced mechanical valve controlling the movements thereof, an electro magnet or magnets arranged to control the movement of said valve, and an electric circuit extended from said magnets, and means for breaking and closing said circuit at a distance from said engine, substantially as herein shown and described.

10. The combination, with an elevator-car and its hoisting-engine, of a valve to control the movements of the engine and car, and a valve motor or engine arranged to move said valve, with an electro magnet or magnets controlling the movements of said valve motor, and an electric circuit extended from said magnets to the car, with means for breaking and closing the circuit in the car.

11. The combination, with an elevator-car and its hoisting-engine, of a valve controlling the motion of said engine, a small fluid-pressure motor operatively connected to said valve, and an electrically-actuated auxiliary valve controlling said valve-motor, and operative electric connections extended to the car, substantially as set forth.

12. The combination, with an elevator-car and its hoisting-engine and a valve controlling the movements of said engine, of a small fluid pressure motor operatively connected to said engine-valve, an auxiliary valve controlling said valve motor, and an electro magnet or magnets operating said auxiliary valve, substantially as herein set forth.

13. The combination, with an elevator-car and its hoisting-engine and a main valve controlling the said engine, of a small fluid-pressure motor external to said main valve, operatively connected therewith, but supplied with motive fluid separately therefrom, and an independent auxiliary valve controlling said valve-motor, substantially as shown and described.

14. The combination, with an elevator-car and its hoisting-engine and a main valve controlling the motion of said engine, of a motor-cylinder closed at each end and a double-acting piston working therein and operatively connected to said valve, with double-acting auxiliary valve-controlling induction and eduction ports between said cylinder and a source of motive fluid, and an electric motive device or magnet actuating said auxiliary valve, substantially as set forth.

15. The combination, with an elevator-engine, of a small fluid-pressure motor, such as *l*, and an electrically-actuated valve controlling the motion thereof, with the main valve-cylinder B connected to said engine, the double piston-valve *b b'* in said cylinder, connected to and actuated by said motor, and the ports *a e d* in said cylinder, arranged and operating substantially as shown and described.

16. The combination, with an elevator-car and its hoisting-engine and a main valve controlling the engine, of a small double-acting fluid-pressure motor connected to and operating said valve, an auxiliary double-acting inducting and exhausting valve controlling said motor, two electro-magnets arranged, respectively, to move said valve in opposite directions, and circuit-connections operating the magnets, substantially as herein set forth.

17. The combination, with an elevator-car and its hoisting-engine and a valve controlling said engine, of a motor to work said valve, an auxiliary valve controlling said motor, a double armature-core connected to said valve, and two solenoids or tubular magnets arranged to shift said core and its connected valve in opposite directions, substantially as and for the purpose set forth.

18. The combination, with a suddenly-releasable valve, such as C or D, controlling a fluid-passage, of an operating bar or lever arranged to actuate the same, a detent holding said bar inactive, and an actuating weight hung to said bar by an interposed spring, substantially as shown and described.

19. The combination, with a motor or engine, such as *l*, and a valve controlling the same, of two fixed electro-magnets arranged to shift said valve in opposite directions, and the fixed stops *i*, limiting the attracting motions of said magnets, substantially as shown and described.

20. The combination, with an elevator-car and its hoisting-engine, of a valve or stopping device to stop the engine, and a governor responding to increases of speed in the movement of the car or engine, with an electric contact operatively connected with a movable part of the governor, a magnet operatively connected with the stopping device, and an electric circuit between said magnet and contact, arranged and operating substantially as and for the purpose herein set forth.

21. The combination, with an elevating apparatus and with a stopping device or devices for stopping the motion of the same, of a polarized electro-magnet arranged to hold the stopping device normally inactive by the attraction of permanent magnetism, with a normally-open electric circuit connected with the coil of said magnet, and means, substantially such as set forth, for closing said circuit in emergencies, and thus neutralizing the magnet and releasing the stopping device.

22. The combination, with an elevator-engine and with the main stopping and starting valve thereof, of a small fluid motor or engine for actuating said valve, and a fluid-pump for supplying said engine, having its piston connected to an actuating device arranged in the path of a movable part of the elevator-engine and operated thereby, substantially as herein shown and described.

ROBERT M. CURTISS.

Witnesses:
JNO. E. GAVIN,
CHAS. M. HIGGINS.